United States Patent
Ligonesche et al.

(10) Patent No.: US 11,519,558 B2
(45) Date of Patent: *Dec. 6, 2022

(54) DEVICE FOR SUPPLYING PRESSURIZED FLUID, AND ASSEMBLY FOR STORING PRESSURIZED FLUID, COMPRISING SUCH A DEVICE

(71) Applicant: L'Air Liquide, Société Anonyme pour l'Etude et l'Exploitation des Procédés Georges Claude, Paris (FR)

(72) Inventors: Renaud Ligonesche, Herblay (FR); Antoine Frenal, Ezanville (FR); Benjamin Fischer, Fresnes (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 97 days.

This patent is subject to a terminal disclaimer.

(21) Appl. No.: 16/787,459

(22) Filed: Feb. 11, 2020

(65) Prior Publication Data

US 2020/0256516 A1 Aug. 13, 2020

(30) Foreign Application Priority Data

Feb. 11, 2019 (FR) ........................................ 1901331

(51) Int. Cl.
*F17C 13/04* (2006.01)
*F16K 35/14* (2006.01)

(52) U.S. Cl.
CPC .............. *F17C 13/04* (2013.01); *F16K 35/14* (2013.01); *F17C 2205/037* (2013.01); *F17C 2205/0394* (2013.01)

(58) Field of Classification Search
CPC ................ F17C 13/04; F17C 2205/037; F17C 2205/0394; F17C 2201/0109;
(Continued)

(56) References Cited

U.S. PATENT DOCUMENTS 3,035,605 A * 5/1962 Ninnelt ................... F16K 35/00
251/111
10,928,008 B2 * 2/2021 Frenal ..................... F17C 13/04
(Continued)

FOREIGN PATENT DOCUMENTS

FR 2 892 799 5/2007
FR 2 970 313 7/2012
(Continued)

OTHER PUBLICATIONS

WO-2015197946-A1 English_Translation_of_Specification.pdf (Year: 2021).*
(Continued)

*Primary Examiner* — Timothy P. Kelly
*Assistant Examiner* — Stephanie A Shrieves
(74) *Attorney, Agent, or Firm* — Elwood L. Haynes (57) ABSTRACT

Device for supplying pressurized fluid, including a first valve accommodating an internal fluid circuit, the device having a second valve having an internal circuit, the second valve forming a separate physical entity from the first valve, the first valve and the second valve having respective coupling members that form a male/female quick-connection system for removably connecting the second valve to the first valve, the internal circuits including a set of control valves for allowing or preventing the flow of the fluid towards an outlet of the device when the second valve is coupled to the first valve via the quick-connection system.

3 Claims, 4 Drawing Sheets

(58) Field of Classification Search
CPC .......... F17C 2201/058; F17C 2201/056; F17C 2203/0617; F17C 2205/0308; F17C 2205/0305; F17C 2205/0329; F17C 2223/0123; F17C 2223/036; F16K 35/14; F16K 35/00
USPC .................................. 137/613; 251/89, 89.5
See application file for complete search history.

(56) References Cited

U.S. PATENT DOCUMENTS

| | | | | |
|---|---|---|---|---|
| 2008/0308181 | A1* | 12/2008 | Denis | F17C 13/04 141/360 |
| 2017/0254420 | A1* | 9/2017 | Frenal | F17C 13/04 |
| 2018/0024575 | A1* | 1/2018 | De Potter | F16K 37/005 137/98 |
| 2018/0038552 | A1* | 2/2018 | Frenal | F17C 7/00 |
| 2018/0045373 | A1 | 2/2018 | Frenal | |
| 2018/0087671 | A1* | 3/2018 | Ondo | F16K 1/307 |
| 2019/0219227 | A1 | 7/2019 | Frenal et al. | |
| 2019/0368661 | A1* | 12/2019 | Paoli | F17C 13/04 |

FOREIGN PATENT DOCUMENTS

| | | | |
|---|---|---|---|
| FR | 2 991 750 | 12/2013 | |
| FR | 3 033 388 | 9/2016 | |
| FR | 3 054 290 | 1/2018 | |
| FR | 3 054 291 | 1/2018 | |
| FR | 3 056 278 | 3/2018 | |
| WO | WO-2015197946 A1 * | 12/2015 | ............. G05B 15/02 |
| WO | WO-2016139405 A1 * | 9/2016 | ............. F17C 13/04 |

OTHER PUBLICATIONS

WO-2016139405-A1 English_Translation_of_Specification.pdf (Year: 2021).*
French Search Report for corresponding FR 1901331, dated Oct. 15, 2019.
French Search Report for related FR 1901333, dated Oct. 15, 2019.

* cited by examiner

DEVICE FOR SUPPLYING PRESSURIZED FLUID, AND ASSEMBLY FOR STORING PRESSURIZED FLUID, COMPRISING SUCH A DEVICE

CROSS REFERENCE TO RELATED APPLICATIONS

This application claims the benefit of priority under 35 U.S.C. § 119 (a) and (b) to French Patent Application No. 1901331, filed Feb. 11, 2019, the entire contents of which are incorporated herein by reference.

BACKGROUND

The invention relates to a device for supplying pressurized fluid, and to an assembly for storing pressurized fluid, comprising such a device.

The invention relates more particularly to a device for supplying pressurized fluid, in particular pressurized gas, comprising a first valve accommodating an internal fluid circuit, the device having a second valve comprising an internal circuit, the second valve forming a separate physical entity from the first valve, the first valve and the second valve comprising respective coupling members that form a male/female quick-connection system for removably connecting the second valve to the first valve, the internal circuits comprising a set of control valves for allowing or preventing the flow of the fluid towards an outlet of the device when the second valve is coupled to the first valve via the quick-connection system, the device comprising at least one manually actuable movable control member for controlling the set of control valves, the control member being movable between a first, rest position, in which the flow of fluid towards the outlet is prevented, and a second, active position, in which the flow of fluid towards the outlet is allowed, the quick-connection system comprising a connection piece for connecting the second valve to the first valve, the connection piece being movable between a first position, in which the quick connection between the second valve and the first valve has not been established, and a second position, in which the quick connection between the second valve and the first valve has been established.

The invention relates in particular to a modular device for supplying pressurized gas, comprising a fluid regulating member such as an exchangeable valve, which is connected removably to a base such as a first valve secured to a pressurized gas cylinder.

The invention may relate in particular to an architecture as described for example in the document FR3054290A1 or FR3054291A1.

In the known devices, the control member (lever for example) can be moved into its active position opening the circuit (for withdrawal and/or filling) even when it is not connected (that is to say even when it is coupled via its quick connection) to the high-pressure port (first valve secured to the high-pressure source for example).

For example, a valve driver may be activated by the lever even if the valve that bears it is not (or is not correctly) connected to the valve with which it is intended to cooperate. This may expose the valve driver to damage and even cause accidents. Specifically, risks of leakage or ejection of the valve may arise in the event of unauthorized handling.

SUMMARY

An aim of the present invention is to remedy all or some of the drawbacks of the prior art that are set out above.

To this end, the device according to the invention, which is otherwise in accordance with the generic definition given thereof in the above preamble, is essentially characterized in that, in its first position, the connection piece blocks the control member in its first, rest position so as to prevent it from moving towards its second, active position, and in that, in its second position, the connection piece does not block the control member in its first, rest position so as to allow it to move towards its second, active position.

Furthermore, embodiments of the invention may include one or more of the following features:

- the internal circuit of the first valve extends between a first, upstream end intended to be in communication with a source of pressurized fluid and a downstream end, the internal circuit of the first valve comprising an isolation valve for opening or closing the internal circuit, the internal circuit of the second valve comprising an upstream end intended to be in communication with the downstream end of the internal circuit of the first valve when the second valve is coupled to the first valve and a downstream end forming the outlet that is intended to be connected to an apparatus that uses the fluid, the second valve comprising a movable member for actuating the isolation valve of the first valve in order to open or close the latter, the movement of said movable actuating member being controlled by the control member,
- the first valve comprises a cylindrical end extending along a longitudinal axis, the quick-connection system comprising at least one groove or rib formed on the cylindrical end of the first valve and a system of coupling balls or claws that is secured to the second valve and cooperates with the at least one groove or rib formed on the cylindrical end of the first valve,
- the device has a member for locking/unlocking the mechanical connection of the coupling members of the quick-connection system, the locking/unlocking member being movable relative to the second valve between a first, locking position and a second, unlocking position, wherein in the first, locking position, when the two valves are coupled, the locking/unlocking member prevents the separation of the second valve from the first valve, and in the second, unlocking position, when the two valves are coupled, the locking/unlocking member allows the separation of the second valve from the first valve, said locking/unlocking member constituting the connection piece configured to ensure or prevent the blocking of the control member,
- the locking/unlocking member is mounted on the second valve so as to be movable in translation and/or rotation,
- the blocking of the control member by the connection piece is mechanical and/or magnetic and/or pneumatic blocking that is direct or via an intermediate piece such as a retractable end stop,
- the blocking of the control member by the connection piece is mechanical blocking brought about by an intermediate piece of the device that cooperates on one side with a portion of the control member and on the other side with the connection piece, so as to form or not to form a mechanical end stop for the control member depending on the position of the connection piece,
- the intermediate piece comprises a movable pin that is acted on by a return member,
- the intermediate piece comprises a stem that is secured to the control member and cooperates or does not cooperate by abutment with the connection piece depending on the position of the latter, the blocking, or not, of the control member by the connection piece is direct mechanical blocking between one end of the control member and a portion of the connection piece, so as to form or not to form a mechanical end stop for the control member depending on the position of the connection piece, in its second, active position, the control member blocks the connection piece in its second position, so as to prevent the second valve and the first valve from being separated, and, in its first, rest position, the control member does not block the connection piece in its second position, so as to allow it to move towards its first position and thus allow the second valve and the first valve to be separated, the blocking of the connection piece by the control member is mechanical and/or magnetic and/or pneumatic blocking that is direct or via an intermediate piece such as a retractable end stop, the blocking of the connection piece by the control member is mechanical blocking brought about by an intermediate piece of the device that cooperates on one side with a portion of the control member and on the other side with the connection piece, so as to form or not to form a mechanical end stop for the connection piece depending on the position of the control member, the quick-connection system mechanically blocks the second valve on the first valve at least along a longitudinal axis, the internal circuit of the second valve comprises a downstream end provided with an outlet coupling that opens onto the peripheral surface of the second valve, the device comprises a pressurized fluid cylinder to which the first valve is connected, the device also comprises a protective cap for the first valve that is fastened rigidly to the cylinder, in the connected position of the second valve on the first valve (quick connection established), the quick-connection system allows the second valve to rotate on the first valve about the longitudinal axis and with respect to the cap, the connection piece forms an exterior casing or ring attached to at least a part of the outer surface of the second valve, the connection piece comprises a tubular sleeve disposed around at least a part of the body of the second valve, the movable coupling members comprise balls or claws; in its second position, the connection member does not block the movement of the movable coupling members, and in its first position, the connection member blocks the movement of said movable coupling members.

The invention also relates to an assembly for storing pressurized fluid, comprising a device according to any one of the features above or below.

The invention can also relate to any alternative device or method comprising any combination of the features above or below within the scope of the claims.

BRIEF DESCRIPTION OF THE DRAWINGS

Further particular features and advantages will become apparent from reading the following description, which is given with reference to the figures, in which.

DETAILED DESCRIPTION OF PREFERRED EMBODIMENTS

Figure 1:
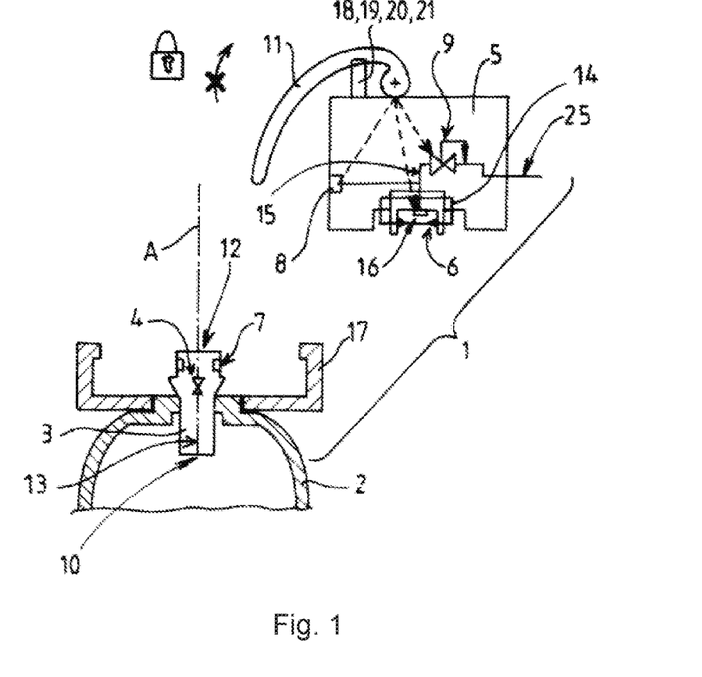
FIG. 1 shows a schematic and partial view in cross section, illustrating an exemplary embodiment of a device for supplying fluid in a disconnected or separated state, in accordance with one embodiment of the present invention.

FIG. 1 shows a device 1 for supplying pressurized fluid, in particular pressurized gas, comprising a first valve 3 mounted in the orifice of a tank 2 and surrounded by a protective cap 17.

The first valve 3 accommodates an internal fluid circuit 13 provided with at least one isolation member 4 for opening or closing the internal circuit 13. The isolation member 4 is an isolation valve, for example.

Figure 2:
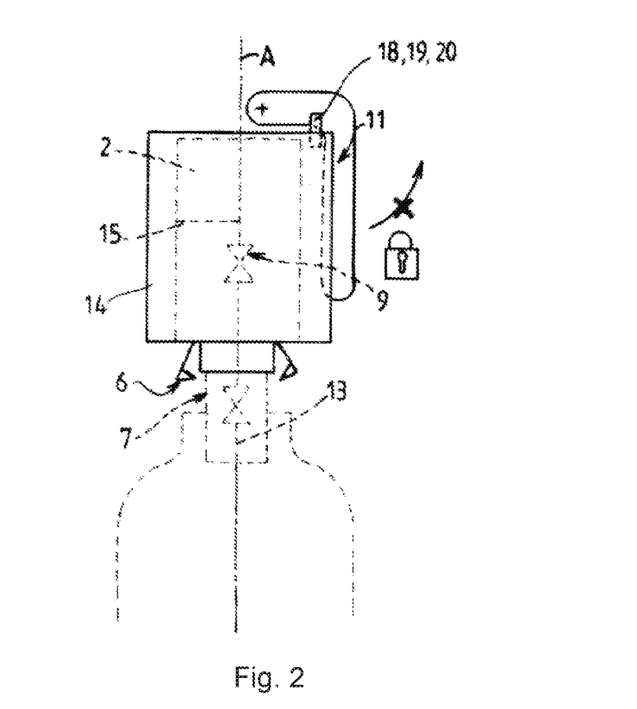
FIG. 2 shows a schematic and partial view in cross section, illustrating a use configuration of a device for supplying fluid in a partially coupled/connected (not locked) state, in accordance with one embodiment of the present invention.
Figure 3:
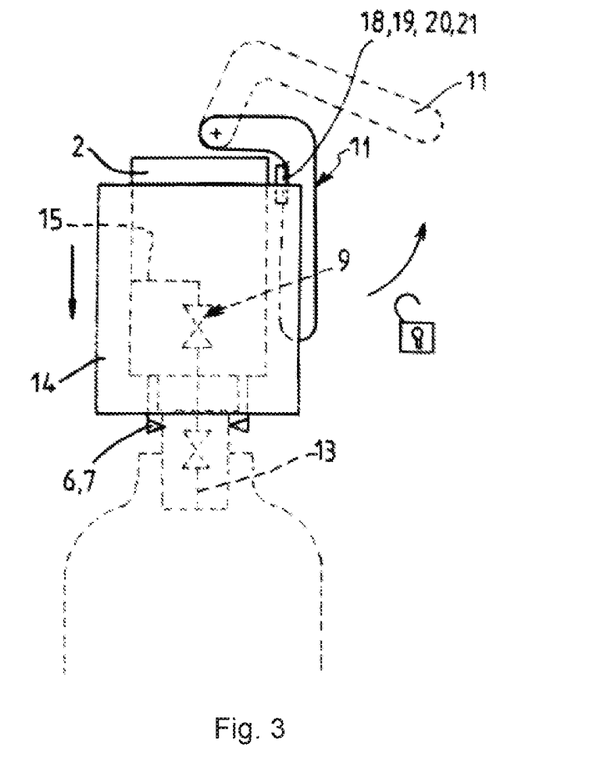
FIG. 3 shows a view similar to the one in FIG. 2 in a coupled/connected (locked) state, in accordance with one embodiment of the present invention.

The device 1 comprises a second valve 5 forming a separate (separable) physical entity from the first valve 3 (in a disconnected position in FIG. 1, in a partially connected/coupled position in FIG. 2 and in a correctly connected/coupled position in FIG. 3).

The second valve 5 is provided with an internal fluid circuit 15 comprising a first, upstream end intended to be fluidically connected to a downstream end 12 of the internal circuit 13 of the first valve 3. The two valves 3, 5 are configured to put their internal circuits 13, 15 into communication when the second valve 5 has been correctly coupled to the first valve 3 via the quick-connection system.

The internal circuit 15 of the second valve 5 may comprise, for example, at least one member 9 for controlling the fluid flow (for example a control valve and/or a fixed or variable pressure reducer and/or a flow rate regulator). The second valve 5 preferably also comprises a movable member 16 for actuating the isolation member 4 of the first valve 3 in order to open or close the latter. For example, the movable actuating member 16 comprises a movable valve driver, the movement of which is controlled by a manual control member 11 carried by the second valve 5, The control member 11 comprises a lever 11 in this example, but could comprise a push-button, a handwheel or any other appropriate member. The lever 11 can, if necessary, control the member 9 for controlling the flow of fluid.

The first valve 3 and the second valve 5 comprise respective coupling members 6, 7 that form a male/female quick-connection/coupling system for removably connecting/coupling the second valve 5 to the first valve 3.

For example, the first valve 3 comprises a cylindrical terminal end extending along a central longitudinal axis A, to which the second valve 5 is connected. The quick-connection system may comprise at least one groove 7 or rib formed on the cylindrical end of the first valve 3 and a system of claws 6, balls (or any appropriate equivalent coupling element) secured to the second valve 5.

The coupling element(s) 6 of the second valve 5 are preferably movable and can be locked/unlocked by, for example, a movable locking member 14 on the second valve 5 (cf. FIG. 2 and FIG. 3). The coupling element(s) 6 of the second valve 5 cooperate with the at least one groove or rib 7 formed on the cylindrical end of the first valve 3.

The lever 11 is movable between a first, rest position, in which the flow of fluid towards the outlet 25 is prevented (cf. for example the low position of the lever 11 in FIG. 1 or the solid-line position in FIG. 2 or FIG. 3), and a second; active position, in which the flow of fluid towards the outlet 25 is allowed (cf. the dashed-line position in FIG. 3).

The quick-connection system comprises a connection piece 14 for connecting the second valve 5 to the first valve 3, for example a locking/unlocking member 14 of the quick connection. The connection piece 14 is movable between a first position, in which the quick connection between the second valve 5 and the first valve has not been established (cf. FIG. 1 or FIG. 2), and a second position, in which the quick connection between the second valve 5 and the first valve 3 has been established (cf. FIG. 3).

For example, in the case in which the connection piece is a locking/unlocking member 14 of the quick connection, this locking/unlocking member 14, depending on the position, allows or does not allow the movement of the movable coupling members 6 (and thus a mechanical connection/disconnection). In its second position, the locking/unlocking member 14 does not allow the movement of the movable coupling members 6 (blocking/locking in mechanically connected position).

The connection piece 14 is thus an indicator between a correct (for example locked) connection, for the one part, and a lack of connection or incorrect or incomplete connection (no mechanical connection or incomplete, non-locked connection), for the other part.

In its first position, the connection locking/unlocking member 14 blocks the control lever 11 in its first, rest position, so as to prevent it from moving towards its second, active position (cf. FIG. 1 or FIG. 2), this locking being symbolized by a closed padlock and a struck-through lever rotation arrow).

In its second position, the locking/unlocking member 14 does not block the control lever 11 in its first, rest position, so as to allow it to move towards its second, active position (cf. FIG. 3), this unlocking being symbolized by an open padlock and a lever rotation arrow that is not struck through).

In other words, if the locking/unlocking member 14 is not in a position that corresponds to correct and locked coupling of the two valves 3, 5, this locking member 14 directly or indirectly prevents the lever 11 from being able to move into its active position (rotation blocked, for example).

As illustrated, the locking/unlocking member 14 of the mechanical connection of the coupling members 6, 7 of the quick-connection system can comprise a sleeve or a ring that is movable in translation on the second valve 5. This locking member 14 is for example movable between a first unlocking position (high position, cf. FIG. 2 or FIG. 1) and a second locking position (low position, cf. FIG. 3).

In the first position, the locking/unlocking member 14 allows for example the travel/movement of the movable coupling members 6 (second valve 5 separated or separable from the first valve 3).

In the second locking position, the locking/unlocking member 14 prevents for example the travel/movement of the movable coupling members 6 (second valve 5 correctly coupled completely to the first valve 3).

The blocking of the control lever 11 by the locking/unlocking member 14 is preferably mechanical blocking that is direct or via an intermediate piece such as a retractable end stop (cf. references 18, 19, 20, 21 in the figures). Of course, this blocking could also or alternatively be magnetic and/or pneumatic for example.

As schematically depicted in particular in FIG. 2 and FIG. 3, the blocking of the lever 11 by the locking/unlocking member 14 is mechanical blocking brought about by an intermediate piece 18, 19, 21 of the device having an end cooperating with a portion of the lever 11 and an end cooperating with the locking/unlocking member 14. The intermediate piece 18, 19, 21 forms or does not form a mechanical end stop for the lever 11 depending on the position of the locking/unlocking member 14.

Figure 4:
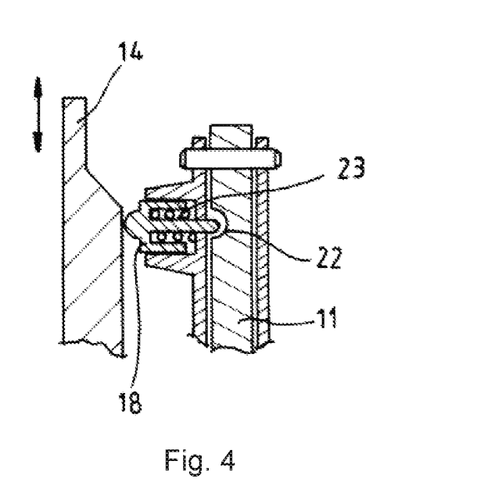
FIG. 4 shows a schematic, partial view in cross section of a detail of the device, illustrating a first exemplary embodiment of a disengageable blocking system of the control member, in accordance with one embodiment of the present invention.
Figure 5:
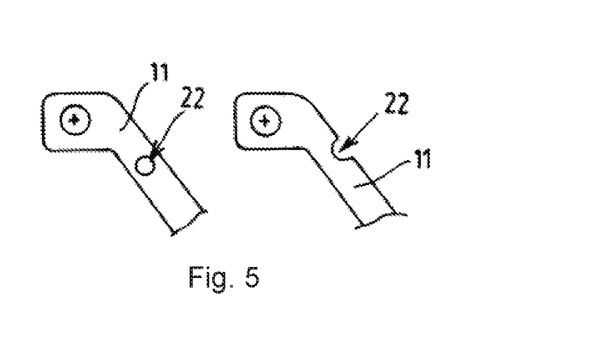
FIG. 5 shows two schematic and partial side views of a detail of the system in FIG. 4, respectively illustrating two possible examples of the structure of the control member; in accordance with one embodiment of the present invention.

In the example in FIG. 4 and FIG. 5, the locking/unlocking member 14 is provided with a profiled area (with a slope for example of the cam type) which returns a movable pin 18 (or stepped pin) for locking the lever 11 into movement in translation. In the non-locked or disconnected position (locking/unlocking member 14 in its first, for example high, position), the profiled area pushes the pin 18 counter to the force of a return spring. One end of the pin 18 is housed in a cavity 22 or housing. The pin 18 then prevents the lever 11 from rotating towards its second, active position. This entire mechanism can be housed in the main body of the device.

By contrast, when the connection is correct and complete (locking/unlocking member 14 in its second, for example low, position), the end of the pin 18 (returned by its spring) is located at the bottom of the slope. The end of the pin comes out of the dedicated cavity or housing in the lever 11, This allows the lever to rotate towards its active position.

Figure 6:
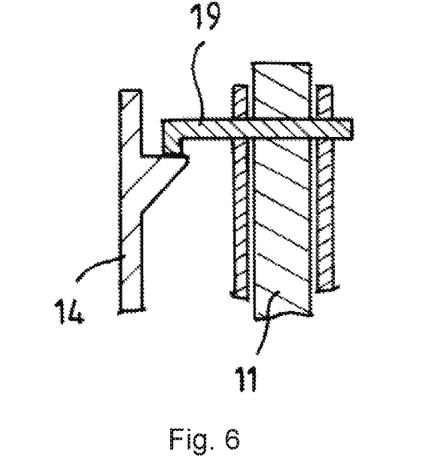
FIG. 6 shows a schematic, partial view in cross section of a detail of the device, illustrating a second exemplary embodiment of a disengageable blocking system of the control member, in accordance with one embodiment of the present invention.
Figure 7:
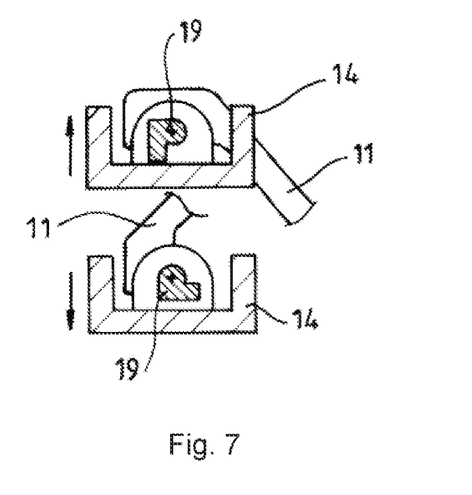
FIG. 7 shows two schematic and partial side views of a detail of the system in FIG. 6, respectively illustrating two states of the blocking system, in accordance with one embodiment of the present invention.

In the example in FIG. 6 and FIG. 7, the locking/unlocking member 14 can be provided with a shape or protuberance (such as a lip or an end stop). One end of the rotary pin of the lever 11 (or directly the lever 11) is itself also provided with a shape or protuberance (such as a tab, boss, square, flat or any other appropriate shape).

In the disconnected position (locking/unlocking member 14 in its first, for example high, position), the protuberance of the locking/unlocking member 14 is positioned so as to butt against the protuberance of the pin of the lever 11 (cf. top part of FIG. 7). This prevents the lever 11 from rotating towards its active position.

In the connected position (locking/unlocking member 14 in its second, for example low, position), the protuberance of the locking/unlocking member 14 also shifts downward and frees up the protuberance of the pin of the lever 11 (cf. bottom part of FIG. 7). This allows the lever 11 to rotate.

Figure 8:
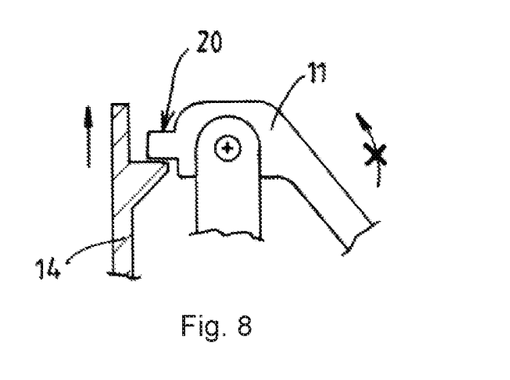
FIG. 8 shows a schematic, partial view in cross section of a detail of the device, illustrating a third exemplary embodiment of a disengageable blocking system of the control member in a first (blocked) state, in accordance with one embodiment of the present invention.
Figure 9:
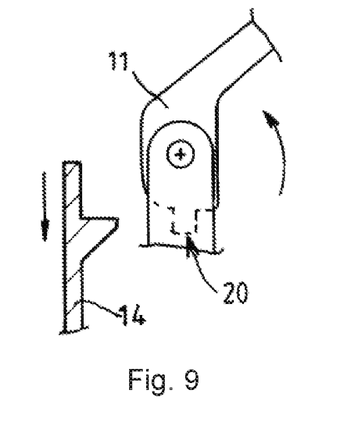
FIG. 9 shows a view similar to the one in FIG. 8, illustrating the third exemplary embodiment of a disengageable blocking system of the control member in a second (non-blocked) state, in accordance with one embodiment of the present invention.

In the example in FIG. 8 and FIG. 9, the locking/unlocking member 14 is provided with a shape or protuberance (end stop) intended to cooperate or not to cooperate with a protuberance formed on the integral cam of the lever 11 (tab and/or boss and/or square and/or flat, etc.).

In the disconnected position (locking/unlocking member 14 in its first, for example high, position), the protuberance of the locking/unlocking member 14 is in abutment against the protuberance of the cam of the lever 11. This prevents the lever 11 from rotating.

In the connected and locked position (locking/unlocking member 14 in its second, for example low, position), the protuberance of the locking/unlocking member 14 also shifts downward and frees up the protuberance of the lever 11. This allows the lever 11 to rotate.

Figure 10:
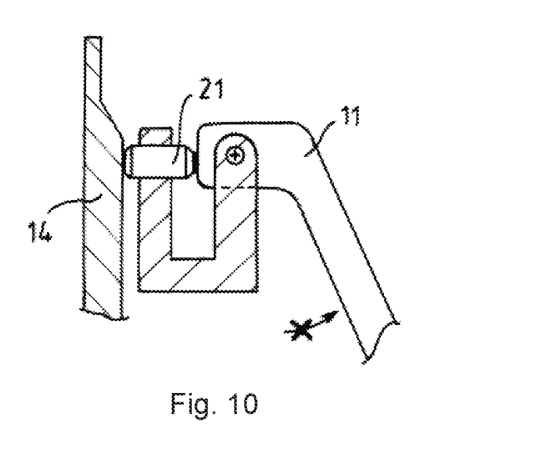
FIG. 10 shows a schematic, partial view in cross section of a detail of the device, illustrating a fourth exemplary embodiment of a disengageable blocking system of the control member in a first (blocked) state, in accordance with one embodiment of the present invention.
Figure 11:
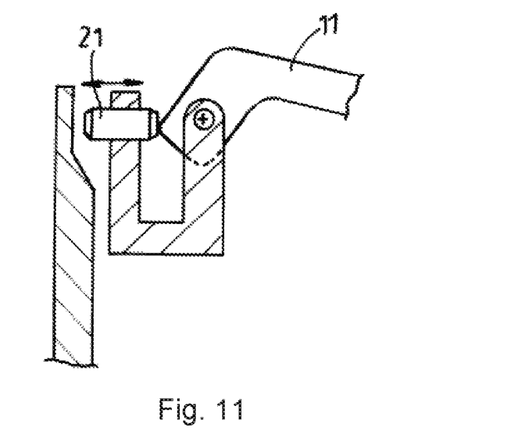
FIG. 11 shows a view similar to the one in FIG. 10, illustrating the fourth exemplary embodiment of a disengageable blocking system of the control member in a second (non-blocked) state, in accordance with one embodiment of the present invention.

In the example in FIG. 10 and FIG. 11, the locking/unlocking member 14 is provided with a profiled area, for example a slope (of the cam type for example). In the disconnected position (locking/unlocking member 14 in its first, for example high, position), this profiled area pushes a pin 21 that is free to move in translation against one of the faces of the cam of the lever 11 and keeps it in abutment thereagainst. This prevents the lever 11 from rotating towards its second, active position.

In the connected and locked position (locking/unlocking member 14 in its second, for example low, position), the end of the pin 21 is located at the bottom of the slope of the profiled area and is thus free to move in translation. The other end of the pin 21 is no longer in abutment against the face of the cam of the lever 11. This allows the lever 11 to rotate.

Figure 12:
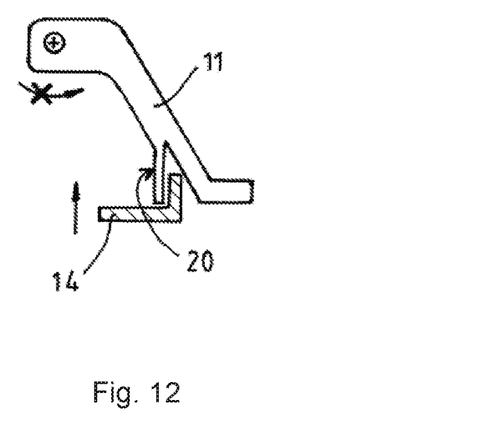
FIG. 12 shows a schematic, partial view in cross section of a detail of the device, illustrating a fifth exemplary embodiment of a disengageable blocking system of the control member in a first (blocked) state, in accordance with one embodiment of the present invention.
Figure 13:
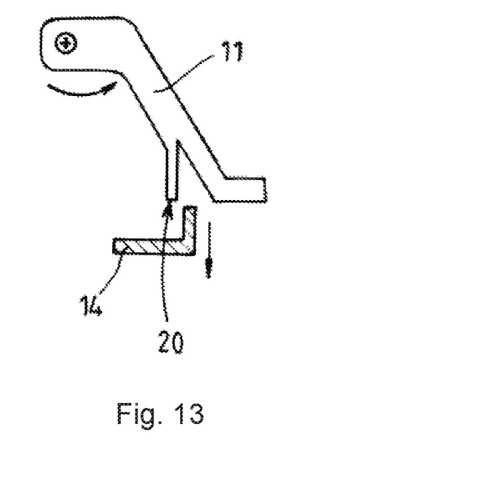
FIG. 13 shows a view similar to the one in FIG. 12, illustrating the fifth exemplary embodiment of a disengageable blocking system of the control member in a second (non-blocked) state, in accordance with one embodiment of the present invention.

In the example in FIG. 12 and FIG. 13, the locking/unlocking member 14 is provided with a shape or protuberance (hook type for example) intended to cooperate or not to cooperate with a portion 20 of the lever 11 (which also has for example a corresponding shape or a protuberance).

In the disconnected position (locking/unlocking member 14 in its first, for example high, position, cf. FIG. 12), the protuberance of the locking/unlocking member 14 is positioned in abutment against or in an interference fit with the protuberance 20 of the lever 11. This prevents the lever 11 from rotating.

In the connected and locked position (locking/unlocking member 14 in its second, for example low, position, cf. FIG. 13), the protuberance of the locking/unlocking member 14 shifts and frees up the protuberance 20 of the lever 11, allowing the lever 11 to rotate.

In the examples described above, the connection piece 14 which blocks or does not block the lever 11 is a locking member 14 for the quick connection. Of course, other embodiment variants are possible and in particular this function of blocking the lever 11 when the second valve 5 is not correctly coupled to the first valve 3 could be ensured in the same way (directly or indirectly) by another movable piece of the quick-connection system (for example by a claw or hook or ball or intermediate movement transmitting piece of the quick connection).

Similarly, said blocking mechanism of the lever 11 could be configured to prevent the separation of the two valves 3, 5 (for example by preventing the locking/unlocking member 14 from moving towards its first, unlocking position) as long as the lever 11 is not in its first, rest position.

In a variant or in combination with the above, that is to say independently of or in addition to the above, the male/female connecting system may advantageously have mechanical elements designed in materials that are compatible with the loads to which they are subjected.

For example, the elements that have to withstand pressure or to maintain in position (for example claws, balls, hooks, stems, springs etc.) are made of metal material and the guiding or gripping means that are mechanically stressed little if at all are made of plastics material.

Each piece and notably the frame or the locking/unlocking member can be divided, in accordance with expected functions:
   into metal elements for the areas to which pressure is
      constantly applied,
   into plastics elements for the guiding areas.

The multiplicity of materials ensure strength and relative lightness.

The connection piece 14 (locking/unlocking member 14, for example a ring) can be provided with a shape or protuberance (hook type). An area of the control member (in particular lever) can for its part be provided with a shape or protuberance. In the disconnected position (ring 14 in the high position), the protuberance of the ring is positioned such that the protuberance of the lever couples up, preventing the lever from rotating into the active position. In the connected position (ring in the low position), the protuberance of the ring also shifts downwards and frees up the protuberance of the lever, allowing the lever to rotate into the active position.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for supplying pressurized fluid, comprising:
   a first valve accommodating an internal fluid circuit,
   a second valve comprising an internal circuit,
      the second valve forming a separate physical entity
         from the first valve, the first valve and the second valve comprising respective coupling members that form a male/female quick-connection system for removably connecting the second valve to the first valve,
the internal circuits comprising a set of control valves for allowing or preventing the flow of the fluid towards an outlet of the device when the second valve is coupled to the first valve via the quick-connection system,
the device comprising:
at least one manually actuable movable control member for controlling the set of control valves,
the control member being movable between a first, rest position, in which the flow of fluid towards the outlet is prevented, and a second, active position, in which the flow of fluid towards the outlet is allowed,
the quick-connection system comprising:
a connection piece for connecting the second valve to the first valve,
the connection piece being movable between a first position, in which the quick connection between the second valve and the first valve has not been established, and a second position, in which the quick connection between the second valve and the first valve has been established,
wherein,
in the first position, the connection piece blocks the control member in the first, rest position so as to prevent movement towards the second, active position, and in that,
in the second position, the connection piece does not block the control member in the first, rest position so as to allow movement towards the second, active position, and in that,
in the second, active position, the control member blocks the connection piece in the second position, so as to prevent the second valve and the first valve from being separated, and in that,
in the first, rest position, the control member does not block the connection piece in the second position, so as to allow movement towards the first position and thus allow the second valve and the first valve to be separated,
wherein the blocking of the control member by the connection piece is mechanical blocking brought about by an intermediate piece of the device that cooperates on one side with a portion of the control member and on the other side with the connection piece, so as to form or not to form a mechanical end stop for the control member depending on the position of the connection piece, and
wherein the intermediate piece comprises a movable pin that is acted on by a return member.

2. A device for supplying pressurized fluid, comprising:
a first valve accommodating an internal fluid circuit,
a second valve comprising an internal circuit,
the second valve forming a separate physical entity from the first valve,
the first valve and the second valve comprising respective coupling members that form a male/female quick-connection system for removably connecting the second valve to the first valve,
the internal circuits comprising a set of control valves for allowing or preventing the flow of the fluid towards an outlet of the device when the second valve is coupled to the first valve via the quick-connection system,
the device comprising:
at least one manually actuable movable control member for controlling the set of control valves,
the control member being movable between a first, rest position, in which the flow of fluid towards the outlet is prevented, and a second, active position, in which the flow of fluid towards the outlet is allowed,
the quick-connection system comprising:
a connection piece for connecting the second valve to the first valve,
the connection piece being movable between a first position, in which the quick connection between the second valve and the first valve has not been established, and a second position, in which the quick connection between the second valve and the first valve has been established,
wherein,
in the first position, the connection piece blocks the control member in the first, rest position so as to prevent movement towards the second, active position, and in that,
in the second position, the connection piece does not block the control member in the first, rest position so as to allow movement towards the second, active position, and in that,
in the second, active position, the control member blocks the connection piece in the second position, so as to prevent the second valve and the first valve from being separated, and in that,
in the first, rest position, the control member does not block the connection piece in the second position, so as to allow movement towards the first position and thus allow the second valve and the first valve to be separated,
wherein the blocking of the control member by the connection piece is mechanical blocking brought about by an intermediate piece of the device that cooperates on one side with a portion of the control member and on the other side with the connection piece, so as to form or not to form a mechanical end stop for the control member depending on the position of the connection piece, and
wherein the intermediate piece comprises a stem that is secured to the control member and cooperates or does not cooperate by abutment with the connection piece depending on the position of the latter.

3. A device for supplying pressurized fluid, comprising:
a first valve accommodating an internal fluid circuit,
a second valve comprising an internal circuit,
the second valve forming a separate physical entity from the first valve,
the first valve and the second valve comprising respective coupling members that form a male/female quick-connection system for removably connecting the second valve to the first valve,
the internal circuits comprising a set of control valves for allowing or preventing the flow of the fluid towards an outlet of the device when the second valve is coupled to the first valve via the quick-connection system,
the device comprising:
at least one manually actuable movable control member for controlling the set of control valves,
the control member being movable between a first, rest position, in which the flow of fluid towards the outlet is prevented, and a second, active position, in which the flow of fluid towards the outlet is allowed, the quick-connection system comprising:
- a connection piece for connecting the second valve to the first valve,
  - the connection piece being movable between a first position, in which the quick connection between the second valve and the first valve has not been established, and a second position, in which the quick connection between the second valve and the first valve has been established,
- wherein,
  - in the first position, the connection piece blocks the control member in the first, rest position so as to prevent movement towards the second, active position, and in that,
  - in the second position, the connection piece does not block the control member in the first, rest position so as to allow movement towards the second, active position, and in that,
  - in the second, active position, the control member blocks the connection piece in the second position, so as to prevent the second valve and the first valve from being separated, and in that,
  - in the first, rest position, the control member does not block the connection piece in the second position, so as to allow movement towards the first position and thus allow the second valve and the first valve to be separated,
- wherein the blocking of the control member by the connection piece is mechanical blocking brought about by an intermediate piece of the device that cooperates on one side with a portion of the control member and on the other side with the connection piece, so as to form or not to form a mechanical end stop for the control member depending on the position of the connection piece, and
- wherein the blocking of the control member by the connection piece is direct mechanical blocking between one end of the control member and a portion of the connection piece, so as to form or not to form a mechanical end stop for the control member depending on the position of the connection piece.

* * * * *